(12) United States Patent
Cutler

(10) Patent No.: US 7,355,623 B2
(45) Date of Patent: *Apr. 8, 2008

(54) SYSTEM AND PROCESS FOR ADDING HIGH FRAME-RATE CURRENT SPEAKER DATA TO A LOW FRAME-RATE VIDEO USING AUDIO WATERMARKING TECHNIQUES

(75) Inventor: Ross Cutler, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 652 days.

This patent is subject to a terminal disclaimer.

(21) Appl. No.: 10/837,973

(22) Filed: Apr. 30, 2004

(65) Prior Publication Data

US 2005/0243168 A1 Nov. 3, 2005

(51) Int. Cl.
*H04N 7/14* (2006.01)

(52) U.S. Cl. ............................ 348/14.12; 348/14.13; 348/14.08

(58) Field of Classification Search .. 348/14.01–14.09, 348/14.1, 14.11, 14.12, 14.13; 370/260, 370/261; 709/204; 345/629
See application file for complete search history.

(56) References Cited

U.S. PATENT DOCUMENTS

| | | | |
|---|---|---|---|
| 5,539,483 A | 7/1996 | Nalwa | |
| 5,745,305 A | 4/1998 | Nalwa | |
| 5,793,527 A | 8/1998 | Nalwa | |
| 5,990,934 A | 11/1999 | Nalwa | |
| 6,005,611 A | 12/1999 | Gullichsen et al. | |
| 6,043,837 A | 3/2000 | Driscoll, Jr. et al. | |
| 6,111,702 A | 8/2000 | Nalwa | |
| 6,115,176 A | 9/2000 | Nalwa | |
| 6,128,143 A | 10/2000 | Nalwa | |
| 6,141,145 A | 10/2000 | Nalwa | |

(Continued)

FOREIGN PATENT DOCUMENTS

JP 360116293 A * 6/1985

(Continued)

OTHER PUBLICATIONS

Co-pending U.S. Appl. No. 10/837,138, "A System and Process for Adding High Frame-Rate Current Speaker Data to a Low Frame-Rate Video", filed Apr. 30, 2004.

(Continued)

*Primary Examiner*—Melur Ramakrishnaiah
(74) *Attorney, Agent, or Firm*—Lyon & Harr, LLP; Richard T. Lyon

(57) ABSTRACT

A system and process for highlighting the current speaker on an on-going basis in each frame of a low frame-rate video of an event having multiple people in attendance, such as a video teleconference, is presented. In general, this is accomplished by periodically identifying an attendee that is currently speaking at a rate substantially faster than the video frame rate, and for each frame of the video updating the frame to highlight the attendee currently speaking. More particularly, an A/V source provides video and audio data streams to the client computing device, with current speaker data embedded into the audio stream via audio watermarking techniques. The client device extracts the current speaker data from the audio stream, and then renders and displays the video while using the current speaker data to periodically update the frame being displayed to highlight the current speaker.

21 Claims, 10 Drawing Sheets

U.S. PATENT DOCUMENTS

| | | | |
|---|---|---|---|
| 6,144,501 A | 11/2000 | Nalwa | |
| 6,175,454 B1 | 1/2001 | Hoogland et al. | |
| 6,195,204 B1 | 2/2001 | Nalwa | |
| 6,219,089 B1 | 4/2001 | Driscoll, Jr. et al. | |
| 6,219,090 B1 | 4/2001 | Nalwa | |
| 6,222,683 B1 | 4/2001 | Hoogland et al. | |
| 6,285,365 B1 | 9/2001 | Nalwa | |
| 6,313,865 B1 | 11/2001 | Driscoll, Jr. et al. | |
| 6,331,869 B1 | 12/2001 | Furlan et al. | |
| 6,337,708 B1 | 1/2002 | Furlan et al. | |
| 6,341,044 B1 | 1/2002 | Driscoll, Jr. et al. | |
| 6,346,967 B1 | 2/2002 | Gullichsen et al. | |
| 6,356,296 B1 | 3/2002 | Driscoll, Jr. et al. | |
| 6,356,397 B1 | 3/2002 | Nalwa | |
| 6,369,818 B1 | 4/2002 | Hoffman et al. | |
| 6,373,642 B1 | 4/2002 | Wallerstein et al. | |
| 6,377,995 B2* | 4/2002 | Agraharam et al. | 709/231 |
| 6,388,820 B1 | 5/2002 | Wallerstein et al. | |
| 6,392,687 B1 | 5/2002 | Driscoll, Jr. et al. | |
| 6,424,377 B1 | 7/2002 | Driscoll, Jr. et al. | |
| 6,426,774 B1 | 7/2002 | Driscoll, Jr. et al. | |
| 6,459,451 B2 | 10/2002 | Driscoll, Jr. et al. | |
| 6,466,254 B1 | 10/2002 | Furlan et al. | |
| 6,480,229 B1 | 11/2002 | Driscoll, Jr. et al. | |
| 6,493,032 B1 | 12/2002 | Wallerstein et al. | |
| 6,515,696 B1 | 2/2003 | Driscoll, Jr. et al. | |
| 6,539,547 B2 | 3/2003 | Driscoll, Jr. et al. | |
| 6,583,815 B1 | 6/2003 | Driscoll, Jr. et al. | |
| 6,593,969 B1 | 7/2003 | Driscoll, Jr. et al. | |
| 6,597,520 B2 | 7/2003 | Wallerstein et al. | |
| 6,611,281 B2* | 8/2003 | Strubbe | 348/14.01 |
| 6,700,711 B2 | 3/2004 | Nalwa | |
| 6,741,250 B1 | 5/2004 | Furlan et al. | |
| 6,741,684 B2* | 5/2004 | Kaars | 379/110.01 |
| 6,756,990 B2 | 6/2004 | Koller | |
| 6,885,509 B2 | 4/2005 | Wallerstein et al. | |
| 6,924,832 B1 | 8/2005 | Shiffer et al. | |
| 7,133,362 B2* | 11/2006 | Chu et al. | 370/230 |
| 2002/0034020 A1 | 3/2002 | Wallerstein et al. | |
| 2002/0054047 A1* | 5/2002 | Toyama et al. | 345/629 |
| 2002/0063802 A1 | 5/2002 | Gullichsen et al. | |
| 2002/0094132 A1 | 7/2002 | Hoffman et al. | |
| 2002/0154417 A1 | 10/2002 | Wallerstein et al. | |
| 2003/0142402 A1 | 7/2003 | Carbo et al. | |
| 2003/0193606 A1 | 10/2003 | Driscoll, Jr. et al. | |
| 2003/0193607 A1 | 10/2003 | Driscoll, Jr. et al. | |
| 2004/0008407 A1 | 1/2004 | Wallerstein et al. | |
| 2004/0008423 A1 | 1/2004 | Driscoll, Jr. et al. | |
| 2004/0021764 A1 | 2/2004 | Driscoll, Jr. et al. | |
| 2004/0252384 A1 | 12/2004 | Wallerstein et al. | |
| 2004/0254982 A1* | 12/2004 | Hoffman et al. | 709/204 |

FOREIGN PATENT DOCUMENTS

| | | | |
|---|---|---|---|
| JP | 2002-218424 | * | 8/2002 |

OTHER PUBLICATIONS

Co-pending U.S. Appl. No. 10/837,244, "A System and Process for Adding High Frame-Rate Current Speaker Data to a Low Frame-Rate Video Using Delta Frames", filed Apr. 30, 2004.

Cutler, R., and L. Davis, Look who's talking: Speaker detection using video and audio correlation, *IEEE Int'l. Conf. on Multimedia and Expo*, 2000, New York, NY.

Cutler, R., Y. Rui, A. Gupta, K. Cadeiz, I. Tashec, L. Wei He, A. Colburn, Z. Zhang, Z. Liu, and S. Silverberg, Distributed meetings: A meeting capture and broadcasting system, *Proc ACM Conf. on Multimedia*, 2002, pp. 123-132.

Kirovski, D., H. Malvar, Spread-spectrum watermarking of audio signals, *IEEE Transactions on Signal Processing*, Apr. 2003, vol. 51, pp. 1020-1033.

Rui, Y., and D. Florencio, New direct approaches to robust sound source localization, *Proc. of IEEE ICME*, 2003, Baltimore, MD, Jul. 6-9.

* cited by examiner

SYSTEM AND PROCESS FOR ADDING HIGH FRAME-RATE CURRENT SPEAKER DATA TO A LOW FRAME-RATE VIDEO USING AUDIO WATERMARKING TECHNIQUES

BACKGROUND

1. Technical Field

The invention is related to adding high-frame rate data to a low frame rate video stream, and more particularly to highlighting the current speaker in each frame of a low frame-rate video.

2. Background Art

Meetings are an important part of everyday life for many workgroups. A variety of live teleconferencing systems are available commercially to enhance and archive these meetings. Both recorded meetings and live video conferences require audio/visual (A/V) capturing equipment. One such system generally referred to as a Distributed Meeting (DM) system provides high quality two-way conferencing and recording of meetings, as well as rich browsing of archived meetings enhanced through a number of analysis techniques. DM systems typically have multiple cameras that simultaneously capture different sub-events occurring in a space where an event occurs, such as a meeting room, to give a rich experience to local and remote meeting participants. These capture devices are all synchronized to provide an integrated, scalable system and method for two-way conferencing, broadcasting, recording and viewing meetings or other events. In particular, a DM system's cameras can include a 360-degree camera centrally positioned to monitor in 360 degrees the space in which the event occurs; a remote view camera positioned so as to capture a view of event participants in the meeting room; a presenter view camera positioned so as to capture a view of the front of the meeting room where a presenter is typically presenting; and a whiteboard capture camera positioned so as to capture strokes written on a whiteboard. A DM system also typically has one or more microphone devices or microphone arrays that simultaneously capture audio data that is synchronized with the image data recorded by the various cameras. A given microphone device or array can be used to determine the direction from which an event participant is speaking by using sound source localization. The 360 degree camera, presenter view camera and remote view camera all can have microphone arrays associated with them. In addition, at least one server or other suitably configured computer that is capable of storing and distributing the captured data to one or more clients in network connection with the server can be included. For live meetings using a DM system, the system broadcasts the multimedia meeting streams to participants, who use a network for low-latency duplex voice and data communication. The meetings can also be recorded and viewed on-demand.

Even with videoconferencing systems such as the DM system available, many businesses do not take advantage of the benefits these systems have to offer. Often the most important impediment for deploying such videoconferencing systems is the bandwidth consumption, which may reach hundreds of kilobits per second for each video stream. For example, sending a complete panoramic image from the 360 degree camera of a DM system with at a full video frame rate would be catastrophic from the bandwidth usage point of view, even with state-of-the-art video compression like WMV9 and H.264. In many applications, however, the importance of a high frame-rate video is of secondary importance compared to the audio portion. It is not necessary for remote participants to see even motion an attendee makes. It is however important for a remote participant to know who is in the meeting and talking so as to better follow the conversation. Thus, the quality of the teleconferencing experience can be significantly improved, even when bandwidth is at a premium, by providing video frames at a slower rate, but with an ongoing indication of the current speaker. The present invention provides such a capability with a low bandwidth cost for use with the foregoing bandwidth limited videoconferencing applications, and more generally for any event where multiple people are attending and it is important to know who is currently talking.

It is noted that in the remainder of this specification the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for highlighting the current speaker on an on-going basis in each frame of a low frame-rate video of an event having multiple people in attendance, such as a video teleconference. In general, this is accomplished by periodically identifying an attendee that is currently speaking at a rate substantially faster than the transmitted video frame rate, and for each frame of the video, updating the frame to highlight the current speaker. This updating can be done at prescribed intervals, or when either an attendee who was not speaking at the time of the last update begins speaking or an attendee that was speaking at the time the last update stops speaking. In this way, the advantages of using low frame-rate video can be realized, such as low bandwidth requirements in scenarios where the event is being transmitted via a computer network, and the use of less costly and often already available audio/video (A/V) equipment. In addition, the disadvantages of low frame-rate video, such as not being able to see who is speaking, can be mitigated by highlighting the current speaker on an ongoing basis in each frame of the video.

In a first embodiment of the foregoing current speaker highlighting system and process, an A/V source provides separate video, audio, and current speaker data streams to a client computing device. The client device then uses these data streams to render and display the video and to periodically update the frame being displayed to highlight the current speaker depicted therein. More particularly, the A/V source obtains audio and video of the event, by for example inputting the video signal from one or more video cameras and the audio signal from one or more microphones placed at the site of the event. The A/V source then generates a separate video and audio data stream, and either transmits them to the client computing device or transfers them to storage. It is noted that the video stream exhibits the aforementioned low frame rate (e.g., 0.2 frames per second (fps)).

Meanwhile, the A/V source also tracks the movements of the attendees and records their positions when each video frame is generated as well as their subsequent positions between the generation of each frame. In addition, the A/V source periodically identifies which of the attendees is currently speaking. As indicated previously, this is done at a rate significantly faster than the video frame rate. The foregoing information is used to periodically generate indicators that at least specify the location of the attendee who is currently speaking as depicted in the last-generated video frame. As indicated above, this is done at prescribed intervals or when the speaking status of an attendee depicted in the last-generated frame changes. It is noted that because the A/V source has tracked the attendees, even if an attendee has moved since the last frame was generated, the identity of that attendee will be known as well as their original location when the frame was generated. In this way, the A/V source is able to specify in the indicator the location of the current speaker in terms of where they appear in the last-generated video frame. The indicators form the aforementioned current speaker data stream. Thus, as each indicator is generated it is transmitted to the client computing device (or transferred to storage for future transmission). As will be described shortly, the client device uses the indicators to highlighting a region in the last-transmitted video frame associated the current speaker.

In one version of the present system and process employing a separate current speaker data stream, the client device updates each video frame by modifying the last rendered version of it (e.g., undo and redraw). In other words, the currently displayed image will reflect the speaker highlighting dictated by the last indicator used for updating the current speaker status. This is opposed to storing the last-received video frame and updating it each time (e.g., by using overlay such that the video frame is one overlay and the highlight is another). In the former case, the client device will need more information so as to un-highlight attendees that were previously speaking, but are not in the latest update. To this end, each time an indicator is generated that specifies the location of the attendee who is currently speaking, a separate indicator is generated for each attendee depicted in the last-generated frame who is not currently speaking. These additional indicators specify the location of the non-speaking attendee and are used by the client device to un-highlight the region in the last-received video frame associated with the attendee whenever that region was highlighted based on a previously received indicator. In order for the client device to know which indicators apply to a current speaker and which to currently non-speaking attendees, each indicator also includes information as to whether the attendee associated with the specified location is speaking or not.

The client computing device of the embodiment of the invention employing a separate current speaker data stream, receives the transmitted video, audio and speaker data streams from the A/V device either directly or via a computer network. As indicated above, the speaker data stream includes indicators that are employed by the client device to highlight the current speaker in the last-received video frame. More particularly, for each indicator received, this first involves determining if the indicator is valid and applies to the last-received video frame. These tasks are carried out in one version using timestamps. To this end, the indicators each also specify the time it was generated. An indicator is deemed valid if it specifies a generation time that is later than the last indicator considered, and it is considered applicable to the last-received video frame if its generation time is later than the expected arrival time of the last-received video frame and prior to the expected arrival time of the next video frame. In another version each indicator further specifies the video frame number to which it applies. In this latter version the determination as to whether an indicator applies to the last-received video frame is simply a matter of determining if the frame number specified in the indicator matches the frame number of the last-received frame. If an indicator is deemed valid and applicable to the last-received video frame, then the location specified in the indicator is used by the client device to highlight or un-highlight a region in the video frame. More particularly, a region in the video frame that has a prescribed size and shape, and which has a prescribed geometric relationship to the location specified in the indicator under consideration, is identified. The appearance of all or a part of the identified region is then modified in a prescribed manner. If the indicator specifies that the location is associated with a current speaker, then the frame is modified to highlight the region so as to visually distinguish a current speaker from all other attendees depicted in the video frame, if it is not already highlighted. If, however, the indicator under consideration specifies that a location is associated with a currently non-speaking attendee, the client device still determines if the region associated with the location is highlighted or not. However, in this case if it is highlighted, the region is modified to un-highlighted it. In versions of this first embodiment of the current speaker highlighting system and process that only employs indicators associated with currently speaking attendees, the later part of the foregoing procedure involving non-speaking attendees is eliminated.

In a second embodiment of the foregoing current speaker highlighting system and process, an A/V source provides only video and audio data streams to the client computing device, and not a separate current speaker data stream. Essentially, the A/V source generates the indicators as described previously, but instead of transmitting these indicators as a separate data stream, they are embedded into the audio stream using audio watermarking techniques. The client computing device operates in a manner similar to that described previously, except it additionally extracts the indicators from the audio stream prior to using them to periodically update the frame being displayed at the time to highlight the current speaker. More particularly, the A/V source obtains audio and video of the event as before. The A/V source then generates the low frame-rate video stream, and either transmits it to the client computing device or transfers it to storage.

Meanwhile, the A/V source tracks the movements of the attendees and records their positions when each video frame is generated as well as their subsequent positions between the generation of each frame. In addition, the A/V source periodically identifies which of the attendees is currently speaking at a rate significantly faster than the transmitted video frame rate. The information is used to periodically generate the aforementioned indicators. This can be done at prescribed intervals or when the speaking status of an attendee depicted in the last-generated frame changes. Each indicator is embedded into the audio stream as it is generated. This modified audio stream is then transmitted or stored.

Similar to the previous embodiment, the client device can update a stored copy of the last-received video frame each time an indicator is extracted from the audio stream, or it can apply the changes specified in the indicator to a version of the last-received frame as modified in accordance with the last-extracted indicator. In the later case, indicators specifying the location of the non-speaking attendees will also be embedded in the audio stream by the A/V source. As such the indicators will also specify whether the location is associated with a currently speaking or non-speaking attendee. The additional indicators are used by the client device to un-highlight the region in the last-received video frame associated with the attendee whenever that region was highlighted based on a previously received indicator.

The client computing device of this embodiment of the invention employing an audio watermark embedded audio stream, receives the transmitted video and audio from the A/V device either directly or via a computer network. The client device synchronizes the audio and video streams via conventional methods. This is of particular significance to the present embodiment because synchronizing the audio with the video has the added effect of synchronizing the indicators embedded in the audio stream with the incoming video frames of the video stream. As a result there is no concern whether the indicators are received in the right order or if an indicator extracted from the audio stream applies to the last received video frame. Accordingly, the client device does not need to perform the related checks needed in the previously-described embodiment. Each indicator received in the incoming audio stream is extracted via the appropriate audio watermark extraction procedure and used to highlight a region in last-received video frame based on the location of the current speaker specified in the indicator. More particularly, the location specified in the indicator is used by the client device to highlight or un-highlight a region in the video frame. This region has a prescribed size and shape, and a prescribed geometric relationship to the location specified in the indicator under consideration. If the indicator specifies that the location is associated with a current speaker, then it is determined if the associated region of the frame it is already highlighted. If not, the frame is modified to highlight the region so as to visually distinguish a current speaker from all other attendees depicted in the video frame. If, however, the indicator under consideration specifies that a location is associated with currently non-speaking attendee, then the client device still determines if the region associated with the location is highlighted or not. However, this time if it is highlighted, the region is modified to un-highlighted it. In versions of this embodiment that only employ indicators associated with currently speaking attendees, the later part of the foregoing procedure involving non-speaking attendees is eliminated.

In a third embodiment of the foregoing current speaker highlighting system and process, an A/V source again only provides video and audio data streams to the client computing device. However, in this embodiment the A/V source also produces delta frames which are interspersed between the full video frames of the low frame rate video. The full video frames act as keyframes and the delta frames provide the differences between frames. Specifically, the delta frames represent just those changes needed to the last-generated keyframe as modified if all previously generated delta frames, if any, applicable to that keyframe were applied thereto, which highlight the region in that keyframe associated with the location of a current speaker and un-highlight any previously highlighted regions associated with the location of an attendee who is not currently speaking. This has the advantage of not requiring the client computing device to process speaker location data to generate the desired highlighting of the current speaker in the frame. Rather the client device operates as a standard A/V rendering and display unit and will need no knowledge of the current speaker at all.

The A/V source in this third embodiment obtains audio and video of the event as before. The A/V source then generates the low frame-rate video stream and the audio stream. In addition, the A/V source tracks the movements of the attendees and records their positions when each video frame is generated as well as their subsequent positions between the generation of each frame. In addition, the A/V source periodically identifies which of the attendees is currently speaking at a rate significantly faster than the transmitted video frame rate. This information is used to periodically generate the aforementioned delta frames. Delta frames can be generated at prescribed intervals or when the speaking status of an attendee depicted in the last-generated frame changes. The delta frames are added to the appropriate timeslots in between the full video frames to create a video stream. The video and audio streams are then either transmitted to the client computing device or transferred to storage.

The A/V source generates each delta frame by, for each attendee depicted in the associated keyframe, first determining if the attendee is currently speaking or not. If it is determined that the attendee is currently speaking, it is next determined if the region of the keyframe (as would be modified by previous delta frames, if any) that is associated with the location of the attendee is highlighted or not. Whenever it is found that the region is not highlighted, change data is added to the delta frame being generated to highlight that region. However, if it is found that the attendee in question is not currently speaking, it is determined if the region of the keyframe (as would be modified by previous delta frames, if any) associated with the location of this non-speaking attendee is highlighted or not. If it is found to be highlighted, change data is added to the delta frame being generated that un-highlights that region. As in the previous embodiments, the regions highlighted or un-highlighted, as the case may be, have a prescribed size and shape, and a prescribed geometric relationship to the location of the associated attendee in the applicable keyframe.

As indicated previously, the client computing device in this third embodiment is simply a standard A/V rendering and display unit. More particularly, the client device inputs the audio and video streams and synchronizes them. The video is then rendered and displayed, while the audio is played.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
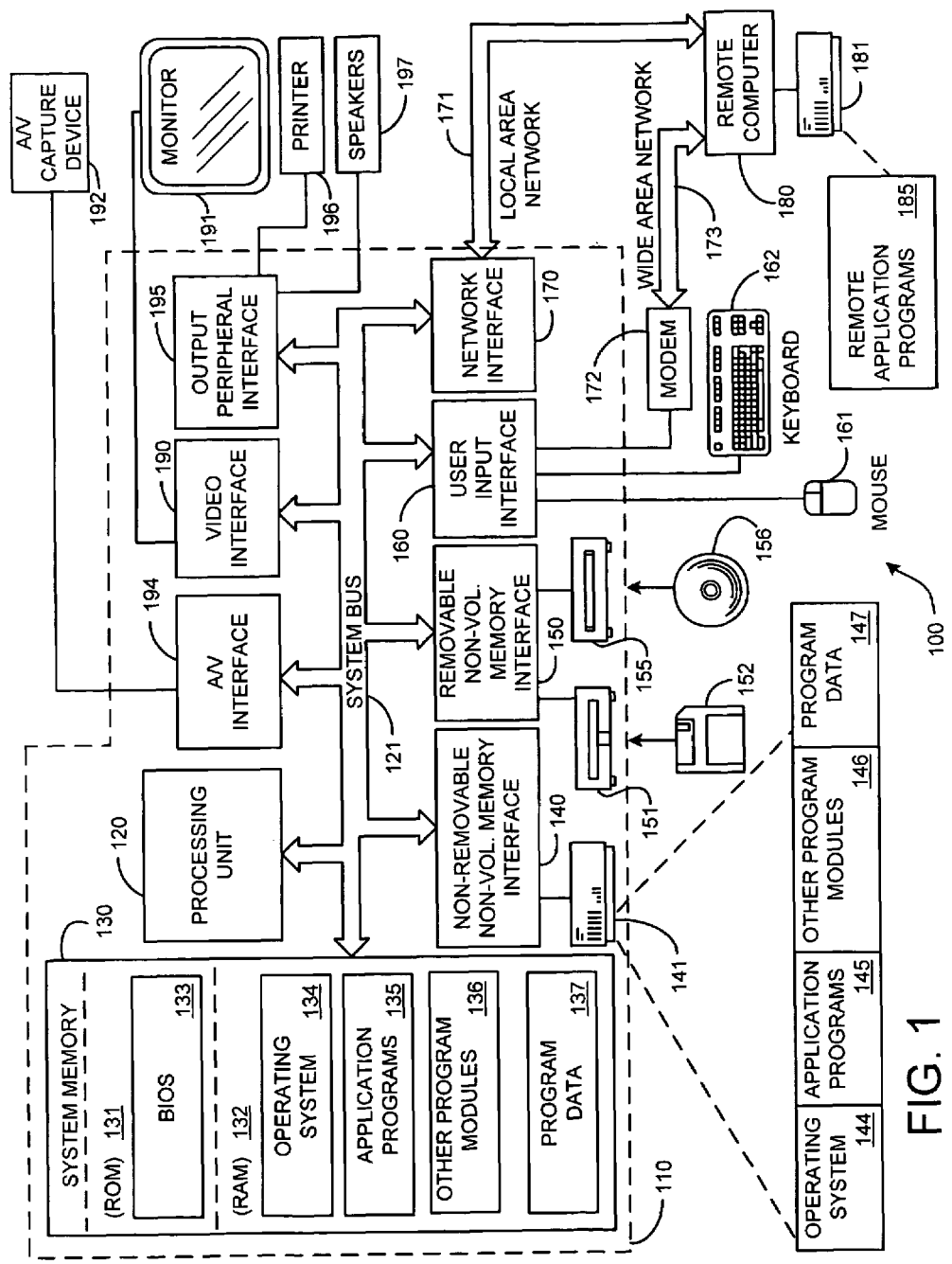
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100.

The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. An audio/video (A/V) capture device 192 (such as the 360 degree camera of the previously described DM system) can also be included as an input device to the personal computer 110. The A/V output from the device 192 is input into the computer 110 via an appropriate A/V interface 194. This interface 194 is connected to the system bus 121, thereby allowing the images to be routed to and stored in the RAM 132, or one of the other data storage devices associated with the computer 110.

The computer 110 operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Current Sneaker Highlighting System and Process

The exemplary operating environment having now been discussed, the remaining part of this description section will be devoted to a description of the program modules embodying the invention. Generally, the system and process according to the present invention involves identifying the current speaker on an ongoing basis and updating the last-produced frame of a low-frame rate video stream to indicate which person depicted therein is currently speaking prior to the time the next video frame is produced. This has distinct advantages in videoconferencing scenarios using low frame-rate video. For example, the use of low frame-rate video (e.g., 0.2 frames per second (fps)) means that a viewer cannot see every move of a group of people having a discussion around a conference room table. However, this information may not be particularly interesting to the viewer. Conversely, knowing who is speaking on a practically real time basis helps the viewer follow the conversation.

Figure 2:
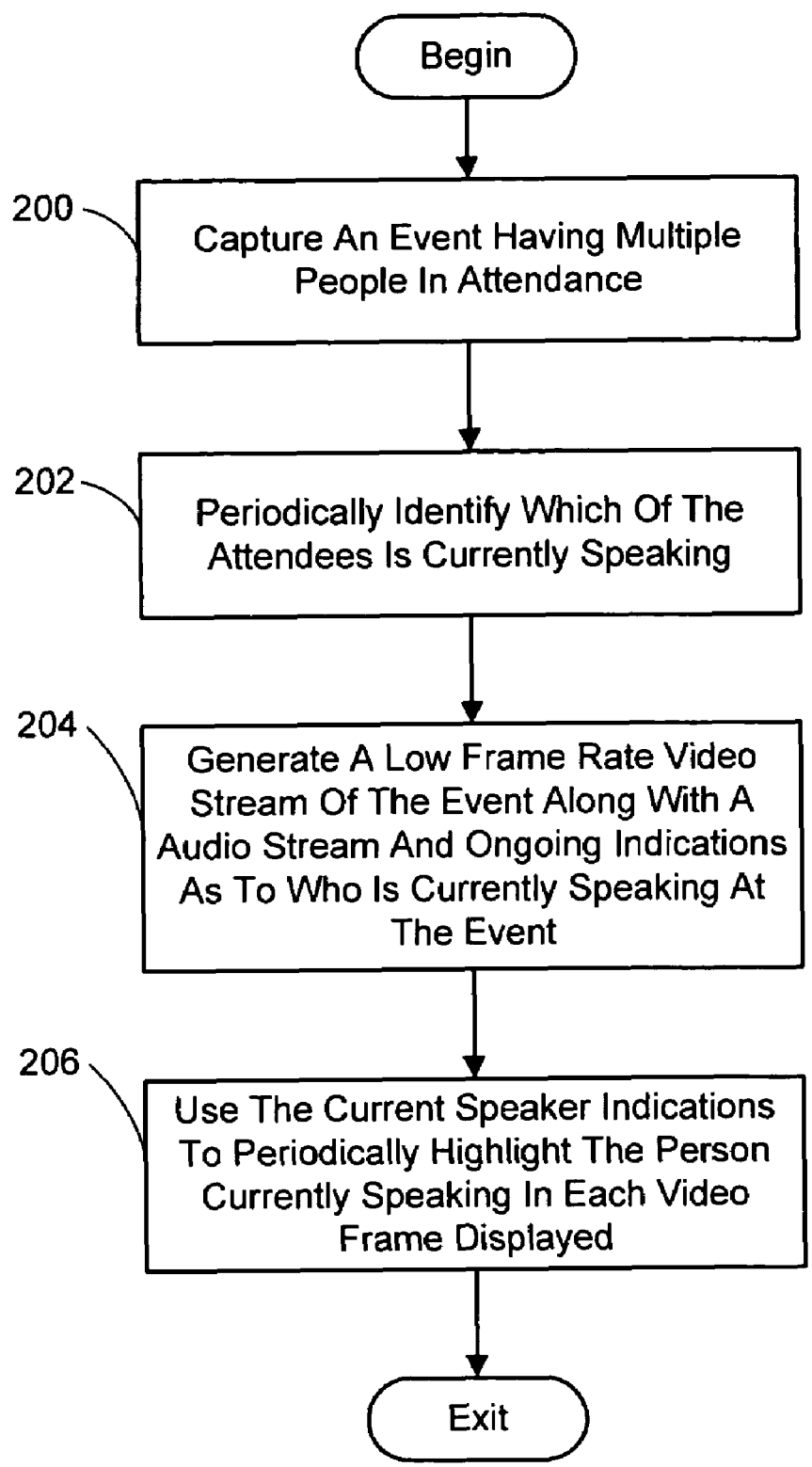
FIG. 2 is a flow chart diagramming an overall current speaker highlighting process for highlighting the current speaker in each frame of a low frame-rate video of an event having multiple people in attendance.

Referring to the process flow diagram of FIG. 2, the current speaker highlighting system is generally realized by an audio/video (A/V) source (such as video conferencing system like the aforementioned DM system), which is used to capture an event having multiple people in attendance (process action 200), such as a business meeting, and to periodically identify which of the attendees is currently speaking (process action 202). Identifying which attendee is currently speaking can be accomplished using any conventional speaker tracking technique to identify the location of the current speaker, such as the sound source localization and image-based person detection and tracking techniques described in [2, 4]. It is noted that speaker tracking is employed because a speaker may move during the time between when successive frames are produced. It is the task of the A/V source to periodically identify the current speaker to facilitate highlighting that speaker in the last-produced frame. If the current speaker were determined each time without regard to prior identification events, then without the use of complex speaker recognition techniques, the A/V source would only know that the current speaker is at a particular current location. If the current speaker had moved since the last video frame was produced, it would be difficult for the A/V source to identify the region in the frame where the current speaker was located. However, by tracking the movements of the speakers, a running account of their current location and their original location when the last video frame was produced, can be maintained. In this way when a speaker is identified as the current speaker, the location in the last-produced video frame where that speaker was depicted can be identified for use in highlighting the speaker in that frame.

Figure 3:
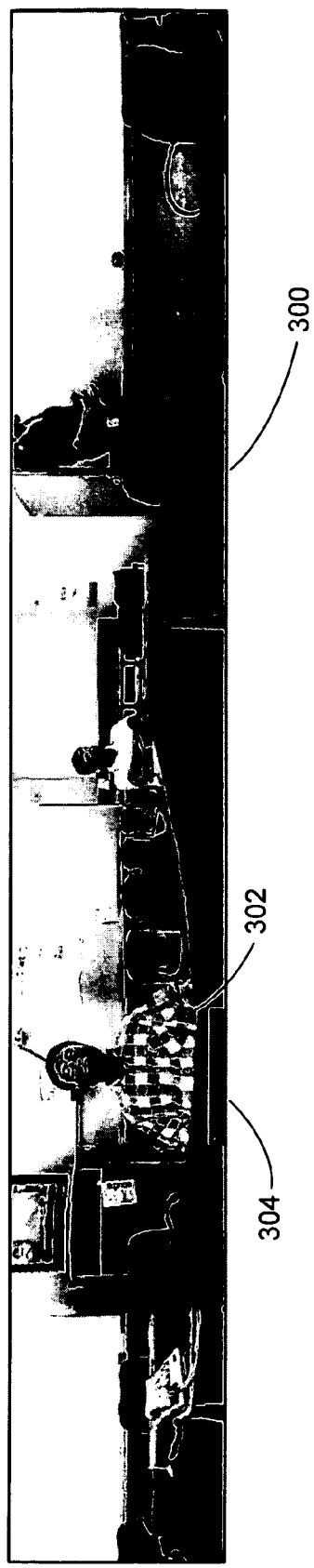
FIG. 3 is an image of a panoramic video frame where the current speaker is highlighted by adding a bar at the bottom of the frame in the vicinity of the speaker in accordance with the process of FIG. 2.

The A/V source next provides a low frame rate video stream of the event, which can be stored or transmitted as desired, along with a continuous audio stream and an indication as to who is currently speaking at the event (process action 204). It is noted that the current speaker indication can be contained within the low frame rate video stream, the audio stream, or as a separate data stream. Each of these embodiments will be described separately in the sections to follow. The current speaker indication is used to highlight the person currently speaking in the video frame provided by the A/V source (process action 206). This highlighting task is generally accomplished by whatever device is receiving the stored or transmitted event data. For example, the data may be delivered to a subscribing client over a network by a server responsible to broadcasting the data. In such a case, the subscribing client computing device would play the incoming data including rendering and displaying the video frame with the current speaker highlighted. It is noted that the method of highlighting the current speaker can be any desired as long as it visually distinguishes the current speaker from other people depicted in the last-rendered video frame. For example, FIG. 3 shows a panoramic video frame 300 (such as would be produced by the previously described 360 degree camera employed in a DM system) where the current speaker 302 is highlighted by adding a bar 304 at the bottom of the frame in the vicinity of the speaker. Another example of visually distinctive highlighting is a thin square placed around the speaker's image.

As mentioned, the current speaker highlighting system and process can be implemented by providing the current speaker indication in a separate data stream or as part of the audio or video streams. Each of these scenarios will now be described.

2.1 The Separate Data Stream Approach

The separate data stream approach for supplying update information to identify the current speaker in relation to the people depicted in the last-produced video frame generally involves the aforementioned A/V source producing a third data stream in addition to the low frame-rate video and continuous audio streams. This third data stream is dedicated to providing periodic data indicating which of the persons depicted in the last-produced video frame, is the current speaker. One way of accomplishing this task is for the A/V source to periodically generate a speaker metadata tuple. This can be done on a regular basis for each speaker depicted in the last-produced video frame, or just any time the status of a person depicted in the last-produced video frame changes (i.e., when a depicted person becomes the current speaker or a previously designated current speaker is no longer speaking).

In one version of the speaker data stream approach, the tuple has the form of the data string: <image location, time, speaking status>. The image location identifies the region of the last-produced video frame associated with the current speaker. The image location parameter can take several forms depending on the type of video frame and whether the client computing device that is to render the frame is programmed with pre-established guidelines. For example, if the video frame is a panoramic image such as can be produced by the previously-described 360 degree camera employed in a DM system, the image location parameter might take the form of the azimuth angle, and the client device would add some form of highlighting to the region in the vicinity of the specified angle based on pre-established guidelines defining the type of highlighting that is to be employed. In another exemplary embodiment, the frame, whether panoramic or not, could be treated in Cartesian terms given a pre-established position of the origin. In this case, the image location could specify an x,y position of a pixel centered on the current speaker. The client device would then add the prescribed highlighting within a bounding box of a pre-established size and shape around the specified pixel location. Alternately, the image position parameter could directly define a bounding box by providing a maximum and minimum value for both the x and y coordinates. Of course, the foregoing are just examples of what form the image location parameter can take. Other location parameter schemes can also be employed, with the caveat that the parameter should require as few bits as possible for cases where the data is to be sent over a network.

The aforementioned time parameter is essentially a timestamp indicating when the current speaker tuple was created. It can take the form of an integer measured in milliseconds relative to some predefined time. The time parameter is particularly useful in applications where the data is transmitted over a network as individual tuples might get lost or delayed and the timestamp will allow the client device to ascertain the appropriate order of incoming speaker data as will be described in more detail shortly. Finally, the aforementioned speaking status parameter is a two-state parameter indicating whether the identified speaker is currently speaking or not.

Figure 4:
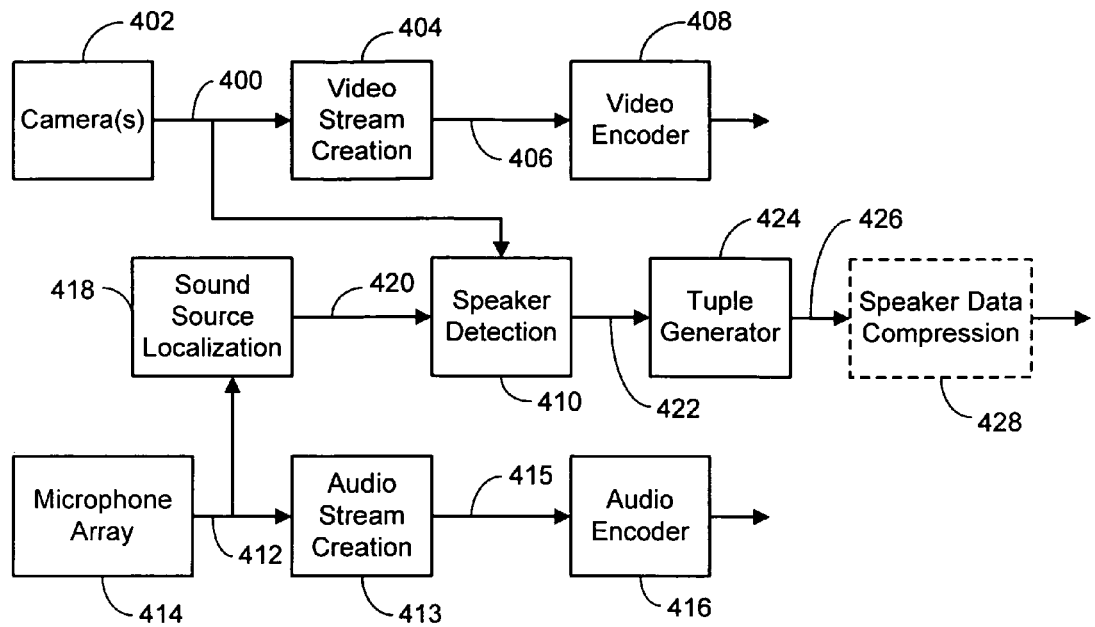
FIG. 4 is a block diagram showing the general computer program module architecture of a first embodiment of the A/V source of the current speaker highlighting system and process according to the present invention where a separate current speaker data stream is generated in addition to the video and audio streams.

An exemplary architecture of the modules employed by the A/V source to generate the three separate data streams is shown in FIG. 4. In this example, the video 400 is captured by a digital camera 402 (or cameras) and fed into a video stream creation module 404 that generates a stream 406 of video frames in a conventional manner and at the prescribed rate. These video frames could be panoramic or not, depending on the application. The video stream 406 is transferred to a video encoder module 408 that encodes the video for transfer to a client computing device or storage. For example, the video stream could be made up of sequential panoramic video frames and encoded using the standard WMV9 encoding scheme. In addition, the video 400 captured by the digital camera(s) 402 is provided to a current speaker detection module 410. The audio 412 is captured by a microphone array 414. The audio signals 412 are provided to an audio stream creation module 413 that generates an audio data stream 415 in a conventional manner. This audio data stream 415 is fed into an audio encoder 416 that encodes the stream for transfer or storage. For example, the audio stream could be encoded using the standard WMS-RT encoding scheme. The audio signals 412 are also transferred to a sound source localization module 418. The results of a sound source localization procedure 420 performed by the sound source localization module 418 are provided to the current speaker detection module 410. The current speaker detection module 410 uses the sound source localization input 420 and the video input 400 to identify the current speaker, and to track the speaker and other people appearing in the video. Conventional techniques for performing this task are currently available [1], as indicated previously. The current speaker information 422 is then provided to a metadata tuple generator module 424. The generator module 424 uses the current speaker information 422 to generate the current speaker data stream 426, including adding the time parameter to each tuple. Optionally, the current speaker data stream can be compressed for transfer by sending it to a speaker data compression module 428 (shown in dashed lines to indicate its optional nature). The video, audio and current speaker data streams are then output or stored. If they are output, they can be output either directly to a client computing device (e.g., via a USB driver), or sent out over a computer network, as desired. It is noted that the foregoing module configuration is just one example of the A/V source configuration according to the present speaker highlighting system and process. Other configurations can also be employed.

For example, while the current speaker detection module operated on inputs from the video camera(s) and the microphone array, other existing speaker location techniques employing just video or just audio could also be used instead. In such a case, only the appropriate input would be made to the current speaker detection module.

Figure 5:
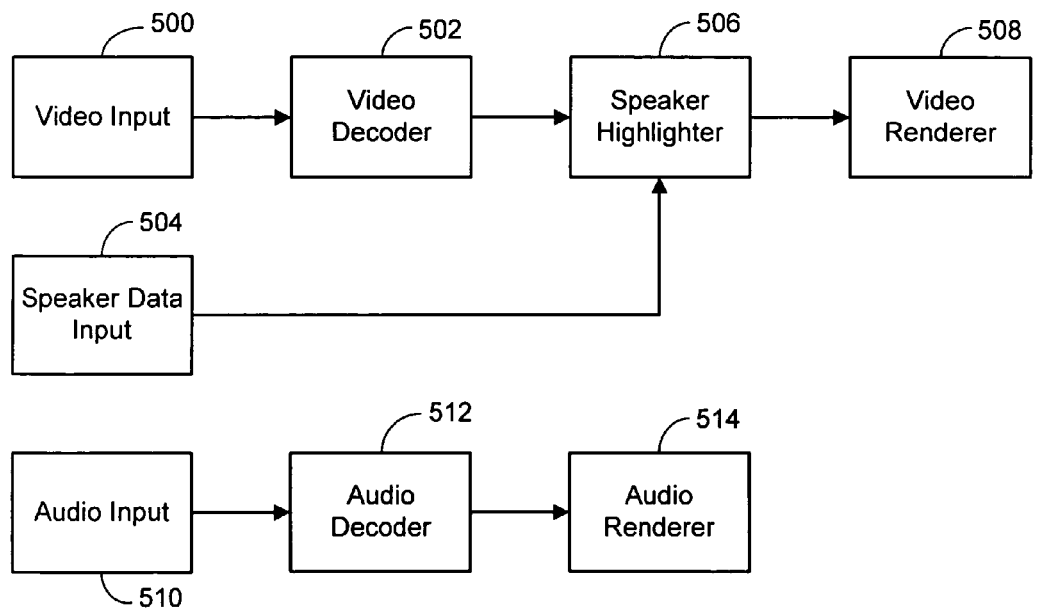
FIG. 5 is a block diagram showing the general computer program module architecture of a first embodiment of the client computing device of the current speaker highlighting system and process according to the present invention where a separate current speaker data stream is received and used to highlight the current speaker on an ongoing basis in each video frame of the low frame-rate video.

An exemplary architecture of the modules employed by a client computing device to receive the three separate data stream generated by the A/V source is shown in FIG. 5, and one way in which the client device can process the incoming tuples in the current speaker data stream is described in reference to the process flow outlined in FIG. 6.

In reference to FIG. 5, the modules for a client computing device to receive each of the aforementioned data streams over a network are shown by way of an example of how the client can be configured in accordance with the present speaker highlighting system and process. As can be seen, each of the data streams is received over the network as RTP source data. In the case of the video data stream, it arrives in this exemplary system in the form of panoramic frames encoded using the standard WMV9 encoding scheme. The video data is received by the RTP Source video input module 500, and transferred to a WMV9 video decoder module 502 where it is decoded. Meanwhile, the speaker data stream arrives at the client in an un-encoded form in this example and is received by a RTP Source speaker data input module 504. This speaker data is then transferred along with the decoded video data to a speaker highlighter module 506. It is noted that if the speaker data stream had been encoded as will be discussed shortly, it would be decoded by an appropriate decoding module (not shown) prior to be transferred to the speaker highlighter module 506. The speaker highlighter module employs the speaker data to highlight the appropriate frame of the incoming video stream as described previously. The resulting highlighted frame data is then transferred to a video renderer module 508 (e.g., Microsoft Corporation's Video Mixing Renderer (VMR)) for rendering and display to a viewer. Concurrent with the input and processing of the video and speaker data streams, the client computing device's RTP Source audio input module 510 inputs an audio data stream, which in this example has been encoded using a standard WMS-RT encoding scheme. This encoded audio data is transferred to a WMS-RT audio decoder module 512 where it is decoded and then sent to an audio renderer module 514 (e.g., Microsoft Corporation's DirectSound® audio renderer) for playback to the viewer.

Figure 6A:
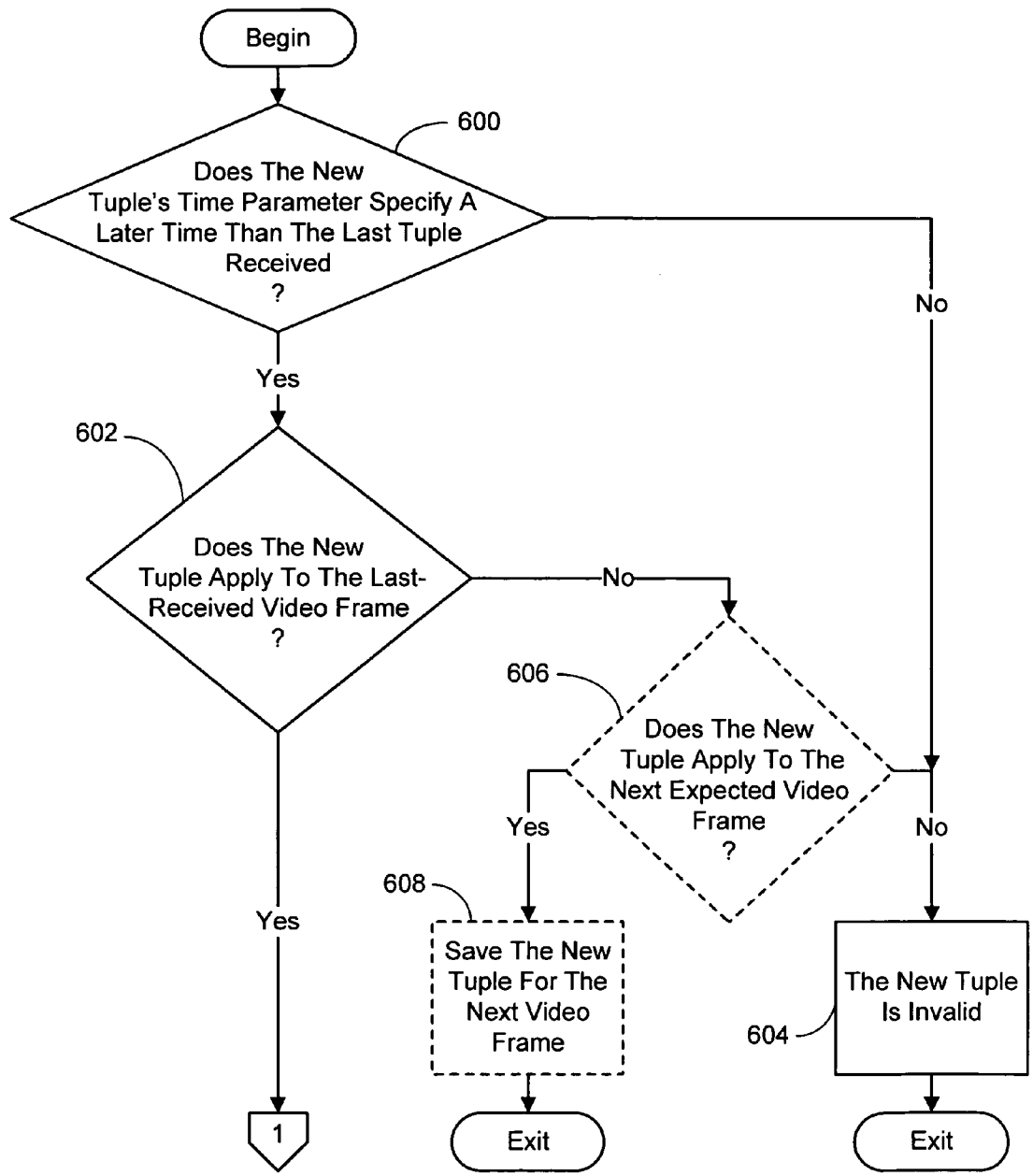
FIGS. 6A-B are flow charts diagramming a process for a client computing device to test the validity and applicability of incoming speaker highlighting data, and then apply the data to highlight just the current speaker in the last-displayed video frame of the low frame-rate video, in the first embodiment where the speaker data is provided in a separate data stream.
Figure 6B:
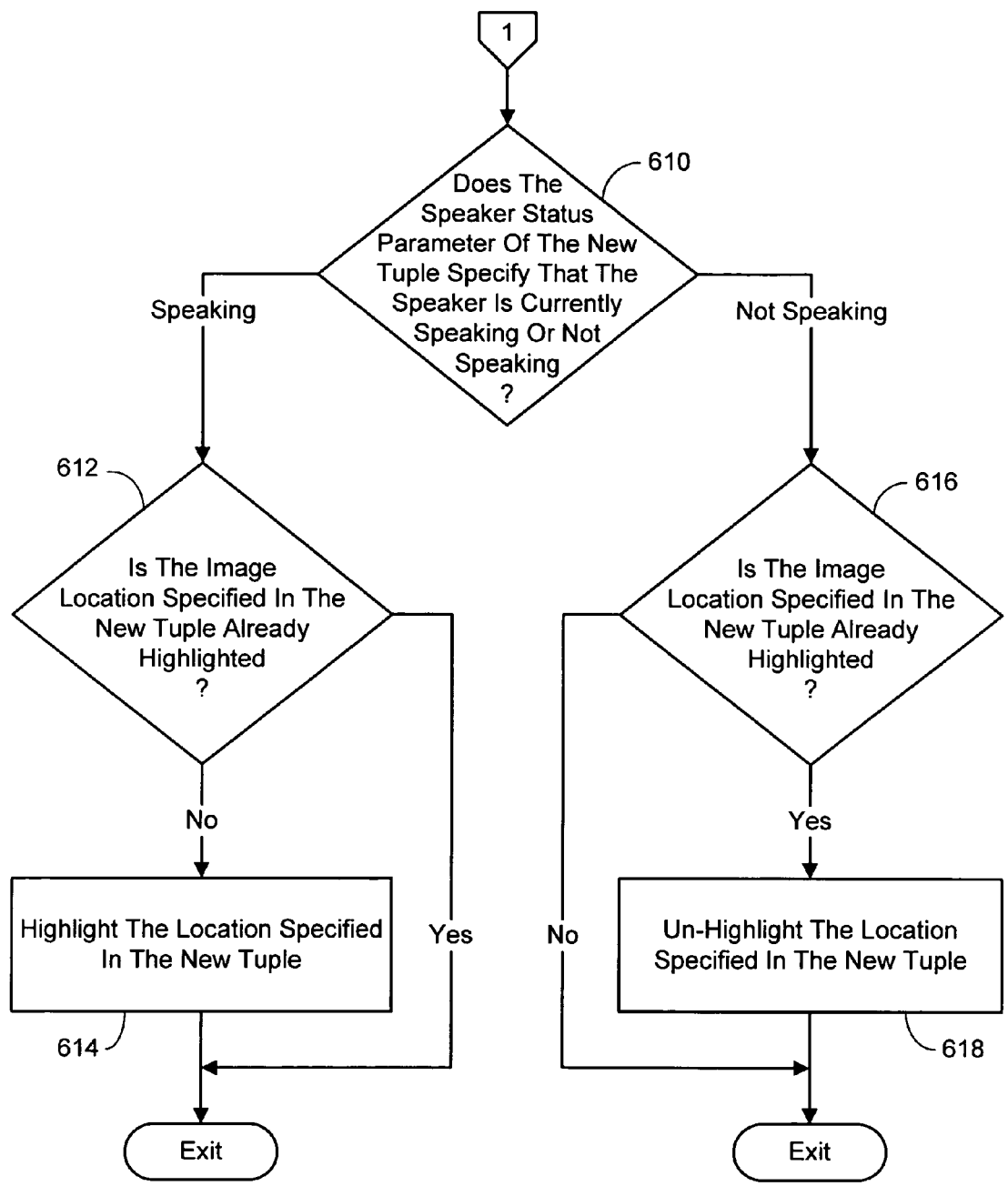

In reference to FIGS. 6A-B, when the client computing device receives a tuple in the incoming current speaker data stream it first determines if it is a valid tuple. This involves determining whether the tuple's time parameter specifies a time that is later than the last tuple received (process action 600) to ensure that the current speaker information contained in the tuple is not outdated. If the time parameter specifies a time that is later than the last-received tuple, then it is determined whether the tuple applies to the last-received video frame (process action 602). This ensures the current speaker data contained in the tuple is applied to the proper video frame. The tuple could include the frame number of the video frame to which it applies in addition to the other parameters. If so, then the foregoing task is simply a matter of comparing the frame number specified in the tuple to the frame number of the last-received video frame, and the time parameter need not even be used. However, as indicated above it is desirable to make each tuple as small a possible, and the time parameter is required anyway for audio synchronization purposes. Thus, in the exemplary tuple described above the video frame number was not included. In this case, in order to determine if the incoming tuple applies to the last-received video frame, it is assumed that the client computing device knows the frame rate at which the video frames are provided from the A/V source, and that using this and the consecutive frame numbers specified for each frame in the video stream, can compute estimated times of arrival for each frame. Given this, it is first ascertained if the last received video frame has the expected frame number and was received at or after the expected arrival time. If so, it is next determined whether the time parameter of the tuple being tested specifies a time that is later than the expected time of arrival of the last-received video frame, and prior to the expected arrival time of the next video frame. If both conditions are true, then it is deemed that the tuple applies to the last-received video frame.

It is noted that in any of the foregoing test actions, if the test is not passed the received tuple is deemed to be invalid in regard to the last-received video frame (process action 604). In one embodiment of the current speaker highlighting process, the invalid tuples are ignored and the process ends. However, there is a possibility that a tuple meant to apply to the next video frame could be received and processed before the arrival of that frame (i.e., the frame is delayed). Given this, there is an alternate way to handle tuples that are deemed invalid because it is determined in process action 602 that the tuple being tested does not apply to the last-received video frame. More particularly, it could be further ascertained whether the tuple applies to the next expected video frame, as shown in the optional process action 606 (which is depicted in FIG. 6 using dashed lines). In the case of the tuple that includes the number of the video frame to which it applies, this determination is simply made by checking to see if the tuple video frame number parameter corresponds to that of the next video frame expected. In the case where the tuple does not include the video frame number parameter, the client computing device can ascertain whether the tuple's time parameter specifies a time that is after the expected arrival time of the next frame and prior to the expected arrival time of the frame after that. If so, then it is deemed that the tuple applies to the next expected video frame. In either case, if it is determined a tuple being tested applies to the next expected video frame, it is saved (optional process action 608) and processed when the next video frame is received.

Assuming all the foregoing tests are passed and it is deemed the tested tuple applies to the last-received video frame, the process continues with the client computing device applying the current speaker data contained in the tuple. More particularly, referring to FIG. 6B, the client computing device determines if the speaker status parameter specifies that the attendee associated with the tuple is currently speaking or currently not speaking (process action 610). If the attendee is speaking, it is next determined if the image location specified in the tuple is already highlighted or not (process action 612). If the location is highlighted, then no action is taken. Should it be determined that the image location specified in the tuple is not highlighted in the last received frame, then the client computing device highlights the location specified in the tuple using the aforementioned pre-established highlighting guidelines and conventional rendering techniques (process action 614).

If, however, it is found in process action 610 that the speaker is not speaking, it is determined if the image location specified in the tuple is already highlighted or not (process action 616). If the location is highlighted, then the client computing device un-highlights the location specified in the tuple using conventional rendering techniques (process action 618). If the specified location is not highlighted, then no action is taken.

It is noted that as an alternative to the client computing device updating the last-rendered frame including all the changes made in view of a previously-received tuple, the frame as it was originally received could be stored, re-rendered and updated each time a new valid tuple is received. This would mean that only tuples specifying the location of the current speaker need be generated by the A/V source and provided to the client device, thereby eliminating the need for the speaker status parameter.

The current speaker data stream can be made even smaller by compressing it. This can be accomplished in a number of ways. For example, the stream can be compressed by quantizing the speaker number (8 bits), the location (7 bits assuming the location is characterized as an angle associated with a panoramic video frame), and the speaker status (1 bit) parameters. In addition, the time parameter could be encoded as an integer frame number (8 bits), such that each timestamp in turn is represented by the next consecutive "frame number". Thus the tuple can be as small as 8+7+1+8=24 bits long. Accordingly, for example, assume the tuples are generated using the aforementioned regular basis option and transmitted every 100 ms. This would result in a bandwidth of only 240 bps. This compression statistic can be reduced even further by employing the other option of just sending tuples when a speaker's status has changed. Compression can also be increased by encoding just the differences between successive tuples, and/or by applying other conventional data compression techniques (e.g., Huffman encoding).

2.2 The Audio Watermarking Approach

The audio watermarking approach for supplying update information to identify the current speaker in relation to the people depicted in the last-produced video frame is similar to the separate data stream approach described in the previous section in that current speaker information is provided to the client computing device. However, the audio watermarking approach involves embedding the current speaker data into the audio stream, rather than employing a third data stream. This has the advantage of reducing the bandwidth requirements in comparison to the separate data stream approach, and so is particularly useful when the A/V data is being transmitted to a client device over a computer network. Although, it should be noted that additional decoding of the audio stream is required on the client side to retrieve the current speaker data.

As in the separate data stream approach, current speaker data embedded in the audio stream provides a periodic indication of which person depicted in the last-produced video frame is the current speaker. One way of accomplishing this task is for the A/V source to periodically generate speaker metadata tuples as described previously, which are then embedded in the audio stream. Here again, this can be done on a regular basis for each speaker depicted in the last-produced video frame, or just any time the status of a person depicted in the last-produced video frame changes (i.e., when a depicted person becomes the current speaker or a previously designated current speaker is no longer speaking). It is noted, however, that the video and audio streams are already synchronized by a client computing device receiving this data via conventional means. Thus, because the current speaker data is embedded in the audio stream, which is synchronized by the client device with the video stream, the issue of tuples arriving late is not a concern with the audio watermarking approach. Once the audio and video streams are synchronized the current speaker data will automatically be in the proper order and will apply to the last-received video frame. Accordingly, the time parameter discussed previously in connection with the separate data stream approach that was needed to ensure proper ordering and application to the proper video frame, would not have to be included in a current speaker tuple embedded in the audio stream of the present audio watermarking approach.

In general, an audio watermark involves altering the frequency spectrum of an audio signal to embed a pattern. This pattern represents the data that it is desired to encode into the audio signal. The pattern is also embedded in a way that preserves the perceptual characteristics of the original signal. In other words the audio watermark is inaudible to humans. There are several competing technologies in existence that embed data into an audio signal in the aforementioned way [3]. In general all of them work by making the data appear as noise. More particularly, these existing techniques typically encode a watermark within discrete audio signals by taking advantage of the insensitivity of the human auditory system (HAS) to certain audio phenomena. For example, it has been demonstrated that, in the temporal domain, the HAS is insensitive to small signal level changes and peaks in the pre-echo and the decaying echo spectrum. In addition, it has been demonstrated that, in the frequency domain, the HAS is insensitive to small magnitude and phase changes. The existing audio watermarking techniques employ a watermark encoder that uses one or a combination of these phenomena to embed data into an audio signal. To extract the embedded data, a special detector program is employed that is tailored to the embedding process and decodes the watermark. Thus, in the context of the current speaker highlighting system and process employing the audio watermarking approach, the encoder would reside in the A/V source and the detector would reside in the client computing device. In essence, the A/V source would embed each current speaker tuple in the outgoing audio stream and the client computing device receiving the audio stream would decode the tuples as they arrive to obtain the current speaker data.

Figure 7:
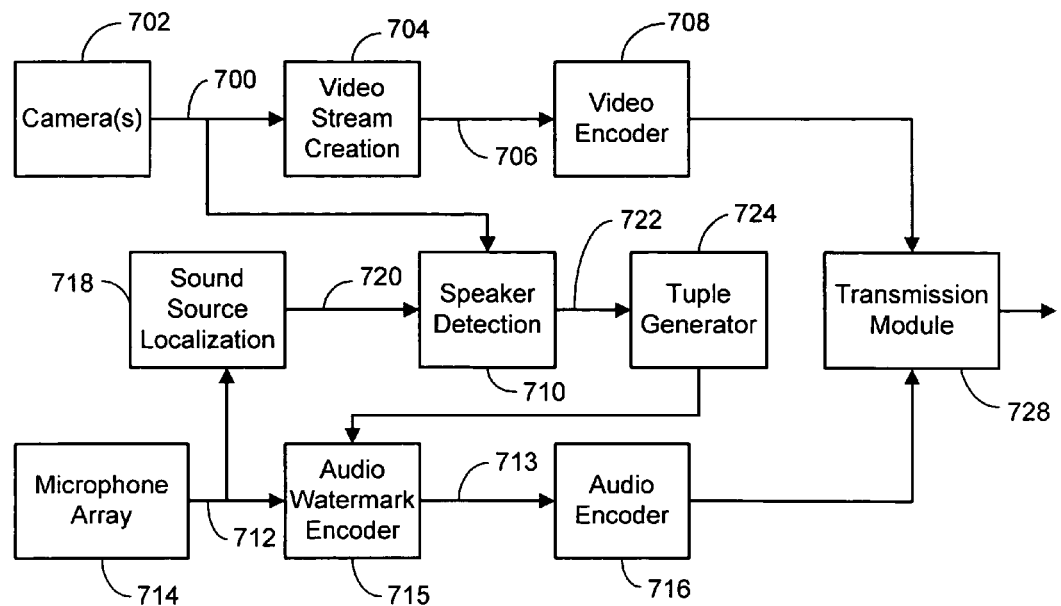
FIG. 7 is a block diagram showing the general computer program module architecture of a second embodiment of the A/V source of the current speaker highlighting system and process according to the present invention where the current speaker data is embedded in the audio data stream via audio watermarking techniques.

More particularly, referring to FIG. 7, the modules for an example A/V source used to generate the video and watermark encoded audio are shown. The video 700 is captured by a digital camera 702 (or cameras) and fed into a video creation module 704 that generates a stream 706 of video frames in a conventional manner and at the prescribed rate. These video frames could be panoramic or not depending on the application. The video stream 706 is transferred to a video encoder module 708 that encodes the video for transfer to a client computing device or storage. In addition, the video 700 captured by the digital camera(s) 702 is provided to a current speaker detection module 710. The audio 712 is captured by a microphone array 714. The audio signals 712 are transferred to an audio watermark encoding module 715. The audio signals 712 are also transferred to a sound source localization module 718. The results of a sound source localization procedure 720 performed by the sound source localization module 718 are provided to the current speaker detection module 710. The current speaker detection module 710 uses the sound source localization input 720 and the video input 700 to identify the current speaker, and to track the speaker and other people appearing in the video using conventional techniques. The current speaker information 722 is then provided to a tuple generator module 724. The generator module 724 uses the current speaker information 722 to generate the current speaker data stream 726. This data stream 726 is then sent to the audio watermark encoder module 715, which embeds the current speaker metadata tuples into the audio stream. The audio stream 713 is then transferred to an audio encoder 716 that encodes the audio for transfer or storage. The video and audio streams are then output or stored via a transmission module 728. If they are output, they can be output either directly to a client computing device (e.g., via a USB driver), or sent out over a computer network, as desired. It is noted that the foregoing module configuration is just one example of the A/V source configuration according to the present speaker highlighting system and process using an audio watermarking approach. Other configurations can also be employed. For example, while the current speaker detection module operated on inputs from the video camera(s) and the microphone array, other existing speaker location techniques employing just video or just audio could also be used instead. In such a case, only the appropriate input would be made to the current speaker detection module.

Figure 8:
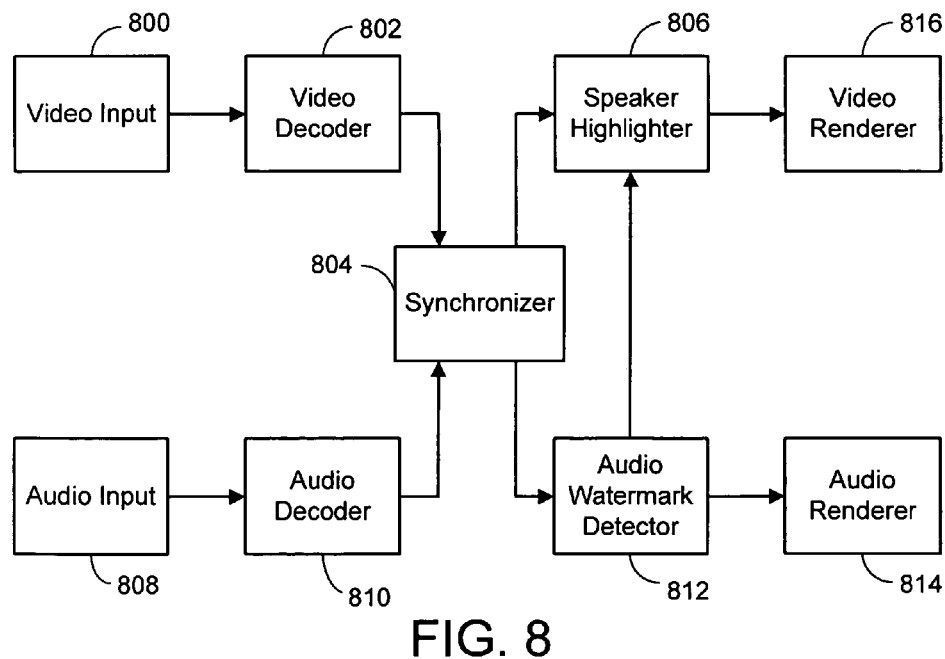
FIG. 8 is a block diagram showing the general computer program module architecture of a second embodiment of the client computing device of the current speaker highlighting system and process according to the present invention where the current speaker data stream is received embedded in the audio stream via audio watermarking techniques, extracted and then used to highlight the current speaker on an ongoing basis in each video frame of the low frame-rate video.
Figure 9:
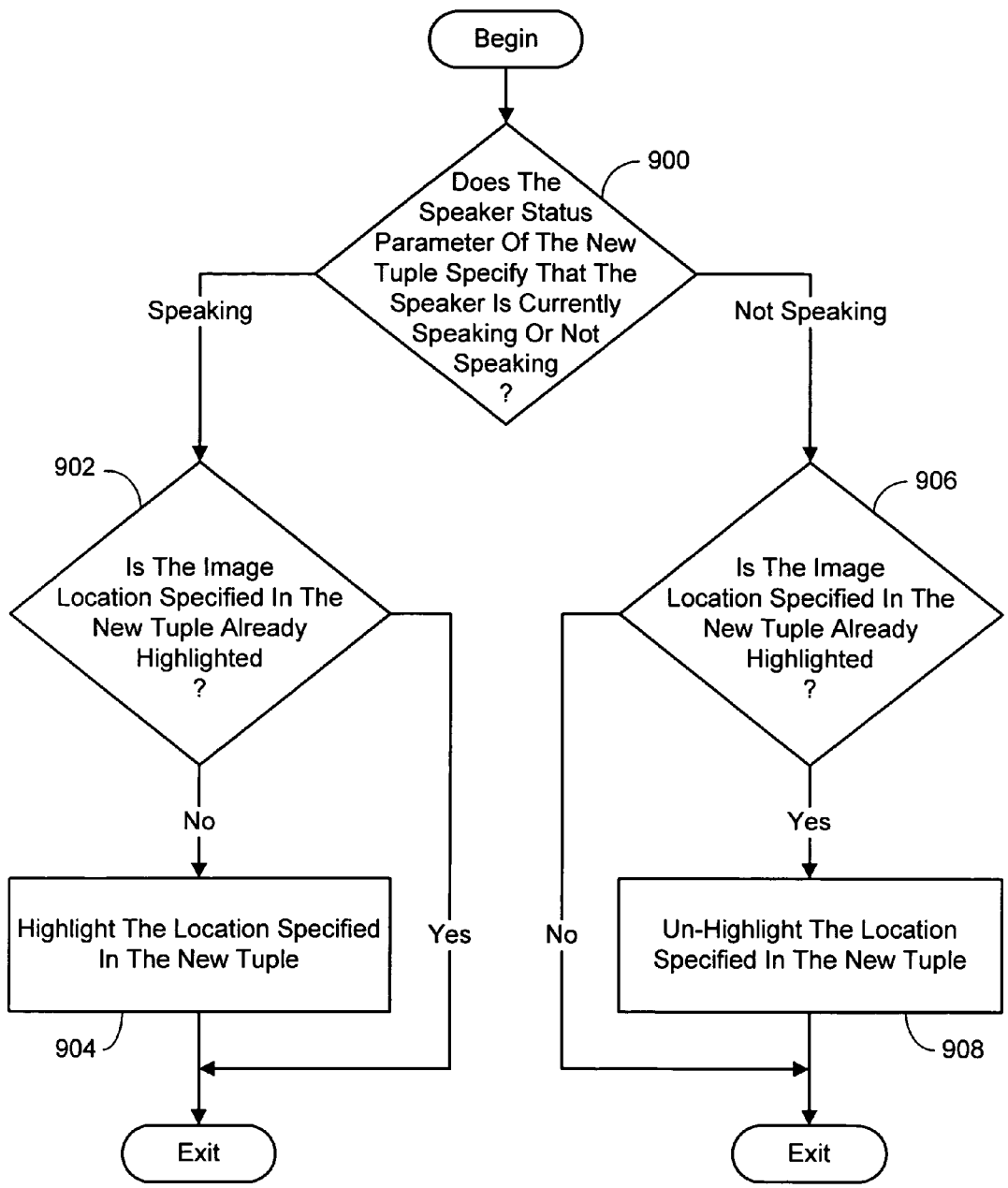
FIG. 9 is flow chart diagramming a process for a client computing device to apply current speaker data to highlight just the current speaker in the last-displayed video frame of the low frame-rate video, in the second embodiment where the speaker data is embedded in the incoming audio stream.

An exemplary architecture of the modules employed by a client computing device to receive the video stream and watermark encoded audio stream generated by the A/V source is shown in FIG. 8, and one way in which the client device can process the incoming tuples in the audio stream is described in reference to the process flow outlined in FIG. 9.

Referring to FIG. 8, an example of the modules a client computing device can employ to receive the video and audio data streams over a network are shown. As can be seen, each of the data streams is received over the network as RTP source data like the example used in the case of the separate data stream approach. In the case of the video data stream, it arrives in this exemplary system in the form of panoramic frames encoded using the standard WMV9 encoding scheme. The video data is received by the RTP Source video input module 800, and transferred to a WMV9 video decoder module 802 where it is decoded. The decoded video stream is then sent to a synchronizer module 804, where it is synchronized with the incoming audio stream. After synchronization, the video stream is provided to the speaker highlighter module 806. Concurrent with the input and processing of the video stream, the client computing device's RTP Source audio input module 808 inputs an audio data stream, which in this example has been encoded using a standard WMS-RT encoding scheme. This encoded audio data is transferred to a WMS-RT audio decoder module 810 where it is decoded, and sent to the aforementioned synchronizer module 804 for synchronization with the video stream. Next, the audio stream is provided to a watermark detector module 812 where the embedded current speaker data is extracted. The audio stream is then sent to an audio renderer module 814 (e.g., Microsoft Corporation's DirectSound® audio renderer). Meanwhile, the current speaker data extracted from the audio stream is transferred to the speaker highlighter module 806. The speaker highlighter module 806 employs the current speaker data to highlight the appropriate frame of the incoming video stream as will be described shortly. The resulting highlighted frame data is then transferred to a video renderer module 816 (e.g., a VMR panorama) for rendering and display to a viewer.

The speaker highlighting process used by the highlighter module is similar to that described in connection with the separate data stream approach, except that it is not necessary to determine the proper order of the incoming tuples or to ascertain if they apply to the last-received video frame because the audio and video streams are synchronized as they are received. Thus, referring to FIG. 9, when the client computing device receives an extracted tuple it determines if the speaker status parameter specifies that the person associated with the tuple is currently speaking or currently not speaking (process action 900). If the person is speaking, it is next determined if the image location specified in the tuple is already highlighted or not (process action 902). If the location is highlighted, then no action is taken. Should it be determine that the image location specified in the tuple is not highlighted in the last received frame, then the client computing device highlights the location specified in the tuple using the aforementioned pre-established highlighting guidelines and conventional rendering techniques (process action 904). If, however, it is found in process action 900 that the person is not speaking, it is still determined if the image location specified in the tuple is already highlighted or not (process action 906). However, in this case if the location is highlighted, then the client computing device un-highlights the location specified in the tuple using conventional rendering techniques (process action 908). If the specified location is not highlighted, then no action is taken.

It is noted that as an alternative to the client computing device updating the last-rendered frame including all the changes made in view of a previously-received tuple, the frame as it was originally received could be stored, re-rendered and updated each time a new valid tuple is received. This would mean that only tuples specifying the location of the current speaker need be generated by the A/V source and provided to the client device, thereby eliminating the need for the speaker status parameter.

2.3 The Delta Frame Approach

The delta frame approach for supplying update information to identify the current speaker in relation to the people depicted in the last-produced video frame has the advantage of not requiring the client computing device to process speaker location data to generate the desired highlighting of the current speaker in the frame. Rather the client device operates as a standard A/V rendering unit and will need no knowledge of the current speaker at all. Generally, this approach involves the A/V source sending the current speaker highlighting embedded into so-called delta-frames, which for many popular video CODECs (e.g. H.261, H.263 or MPEG) transfer only information about the differences between two consecutive frames. Since in the present case the desired difference is just the highlighting itself, the additional bandwidth for transferring this data is minimal. Thus, the delta frame approach introduces additional, though very small, traffic between the A/V source and the client computing device (if it's connected directly to the PC) or on the network (if it is connected via a network device).

The A/V source generates both the low frame-rate video and the delta frames providing the highlighting of the current speaker for each of the full frames (i.e., keyframe) in the video stream. Thus, in essence the A/V source has taken over the processing that led to the highlighting of the current speaker that was performed by the client computing device in the prior two described embodiments. To accomplish this task, the A/V source will need to obtain much of the same information as was previously provided to the client in the form of a speaker data stream or a watermark encoded audio stream. Namely, the A/V source needs to identify the location of each person depicted in a keyframe and to track their movements so as to equate a person who moved since the last keyframe was produced back to their original location in that keyframe. Any location measurement scheme can also be employed for this purpose. In addition, the A/V source needs to know which of the people depicted in a keyframe are speaking at least on a periodic basis. All this information can be obtained using conventional speaker tracking techniques as described previously.

Figure 10:
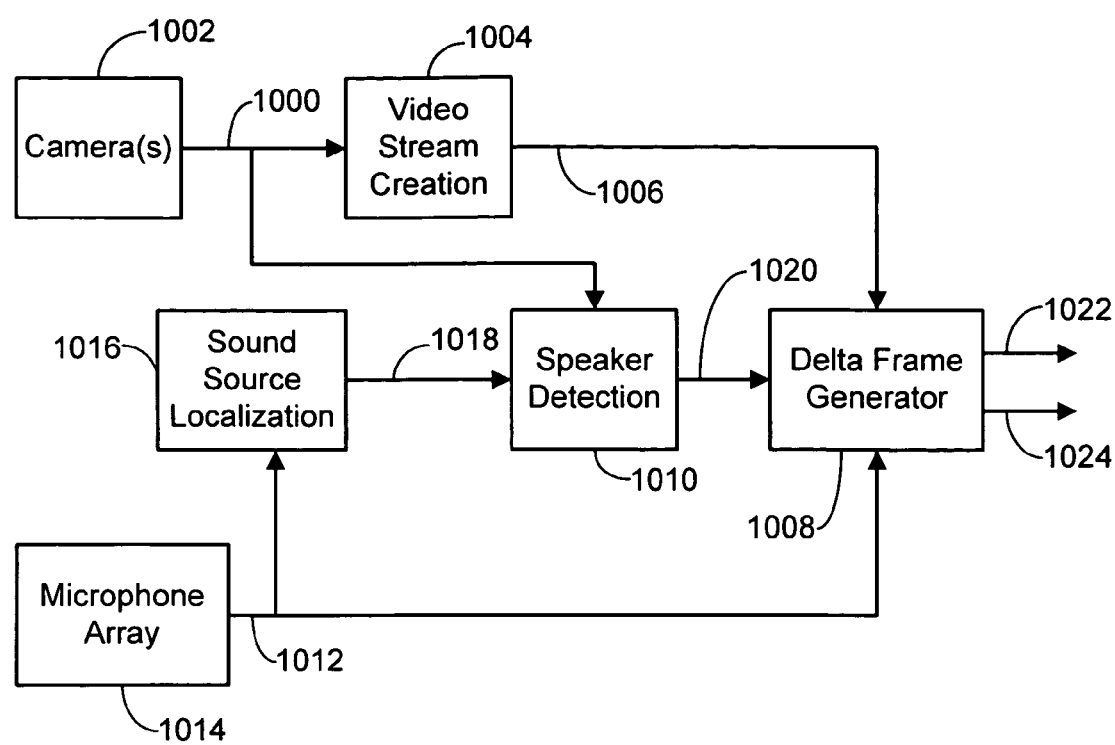
FIG. 10 is a block diagram showing the general computer program module architecture of a third embodiment of the A/V source of the current speaker highlighting system and process according to the present invention where the current speaker is highlighted via the use of delta frames produced by the A/V source and included in the video data stream interspersed between each frame of the low frame-rate video.

More particularly, referring to FIG. 10, the modules for an example A/V source used to generate both the video and audio streams, including the delta frames employed to add current speaker highlighting to the video, are shown. The video 1000 is captured by a digital camera 1002 (or cameras) and fed into a video creation module 1004 that generates a stream 1006 of keyframes in a conventional manner and at the prescribed rate. These keyframes could be panoramic or not depending on the application. The keyframe stream 1006 is transferred to a delta frame generation module 1008 that will be described shortly. In addition, the video 1000 captured by the digital camera 1002 is fed into a current speaker detection module 1010. The audio 1012 is captured by a microphone array 1014. These audio signals 1012 are transferred to a sound source localization module 1016, and are also sent to the aforementioned delta frame generation module 1008. The results of a sound source localization procedure 1018 performed by the sound source localization module 1016 are provided to the current speaker detection module 1010. The current speaker detection module 1010 uses the sound source localization input 1018 and the video input 1000 to identify the current speaker, and to track the speaker and other people appearing in the video. Conventional techniques are used to performing this task, as identified previously. The current speaker information 1020 is then fed into the delta frame generation module 1008. The delta frame generation module 1008 uses the current speaker information 1020, along with the video keyframe stream 1006 and the audio input 1012 to generate video and audio streams 1022, 1024, which are output directly to a client computing device, sent out over a computer network or stored, as desired. In the case of the video stream, it includes both keyframes and delta frames interspersed between the keyframes. The delta frames add the highlighting to the region of an associated keyframe that depicts the current speaker and remove highlighting from the region of the keyframe that depicts a person no longer speaking since the last delta frame (or in some cases the last keyframe) was produced.

Figure 11:
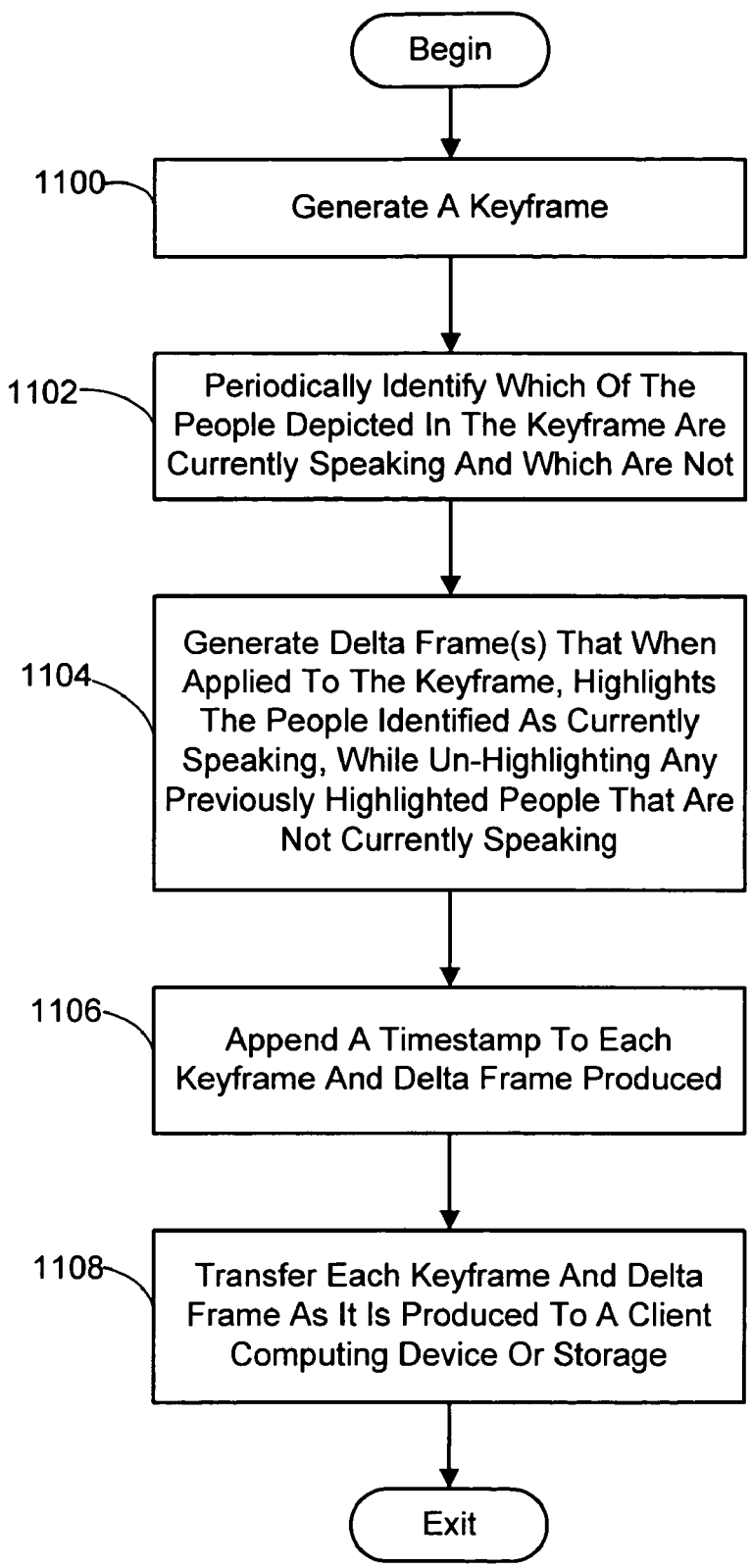
FIG. 11 is flow chart diagramming a process for the A/V source to generate the video data stream of the third embodiment where the current speaker is highlighted in each frame of the low frame-rate video on an ongoing basis via the use of delta frames produced by the A/V source and included in the video data stream interspersed between each frame of the low frame-rate video.

Referring now to FIG. 11, an example of a process by which the encoder generates the aforementioned video stream will be described. The A/V source produces keyframes in a normal manner at the prescribed low frame rate (e.g., 0.2 fps), as indicated previously. For each keyframe produced (process action 1100), the A/V source uses the speaker information described above to periodically generate delta frames, which when applied to the last-produced keyframe or a modified version thereof resulting from the application of previously provided delta frames, highlight the current speaker and un-highlight any persons no longer speaking. This is accomplished by first identifying which of the people depicted in the last-produced keyframe are currently speaking and which are not (process action 1102). The A/V source next generates one or more delta frames that when applied to the last-produced keyframe, highlights the people identified as currently speaking, while un-highlighting any previously highlighted people who are not currently speaking when the delta frame is produced (process action 1104).

Highlighting is added by including data in the delta frame that adds the previously described pre-established highlighting pattern to the region of the keyframe associated with a current speaker based on the location of that person in the last-produced keyframe (regardless of where that person may be located when the delta frame is produced). In this way each time a delta frame is applied to the last-produced keyframe, the current speaker is highlighted and those persons not speaking are not highlighted.

It is noted that in the foregoing example process, each keyframe is produced without any current speaker highlighting. This typically would minimize the amount of change data contained in the first produced delta frame because no "un-highlighting" changes would need to be included when a person speaking when the keyframe is produced, is no longer speaking when a delta frame is produced. However, even if a delta frame is generated immediately after the keyframe is produced, there may still be a noticeable transition where the current speaker highlighting vanishes briefly. If this is unacceptable, the foregoing highlighting procedure can be employed as part of the production of a keyframe, thereby adding current speaker highlighting to the keyframe.

It is further noted that between the production of keyframes, the delta frames can be produced on a regular basis, or just any time the status of a person depicted in the last-produced keyframe changes (i.e., when a depicted person becomes the current speaker or a previously designated current speaker is no longer speaking). The latter approach would minimize the bandwidth requirements, which may be desirable when the video stream is being transmitted over a computer network. However, if the latter approach is employed in an embodiment of the present delta frame approach that also does not add highlighting to the keyframes, a delta frame should be generated regardless of the change in speaker status immediately after the keyframe is produced so as to add highlighting to the current speaker. It is noted that this can also apply to the previously-described first and second embodiments of the present current speaker highlighting system and process because the video frames employed in these embodiments are also un-highlighted when transmitted. Thus, in versions of the first and second embodiments where indicators are produced when the speaking status of a person depicted in the last-produced keyframe changes, an additional indicator should be generated immediately after each keyframe so that the client computing device can add the current speaker highlighting right away, rather than waiting until a change in speaker status.

Referring to FIG. 11 once again, the A/V source also appends a timestamp to each keyframe and delta frame produced (process action 1106). The timestamps can take the form of an integer measured in milliseconds to minimize their size, as before. These timestamps are used by the client computing device in the normal manner to synchronize the playback of the audio and video streams, and to establish the order in which the keyframes and delta frames are rendered. As the timestamped keyframes and delta frames are produced, each is transmitted to a client computing device (or stored for future transfer to a client device) either directly or via a computer network (process action 1108).

The client computing device operates like a standard A/V rendering and display unit as indicated previously. Namely, when the client device receives a video frame, it first determines if the frame is a keyframe. If so, it is rendered and displayed in lieu of any previously received keyframes, or versions of a keyframe amended by the application of a delta frame. The client device then waits for the receipt of another video frame and determines if it is subsequent keyframe or a delta frame. If it is a subsequent keyframe, it is rendered and displayed as indicated above. However, if it is a delta frame, the client device applies it to the last-received keyframe, or if previous delta frames have been received since the last keyframe, it applies it to the modified keyframe which reflects all the changes of the previously received delta frames.

3.0 REFERENCES

[1] Ross Cutler and Larry Davis. "Look who's talking: Speaker detection using video and audio correlation," *IEEE International Conference on Multimedia and Expo (ICME)*, July 2000, Manhattan, N.Y..
[2] Ross Cutler, Yong Rui, Anoop Gupta, JJ Cadiz, Ivan Tashev, Li-wei He, Alex Colburn, Zhengyou Zhang, Zicheng Liu, Steve Silverberg. "Distributed Meetings: A Meeting Capture and Broadcasting System", *ACM Multimedia*, 2002.
[3] D. Kirovski and H. S. Malvar, "*Spread-spectrum watermarking of audio signals*", IEEE Transactions on Signal Processing, vol. 51, pp. 1020-1033, April, 2003.
[4] Yong Rui and Dinei Florencio, "New direct approaches to robust sound source localization", *Proc. of IEEE ICME* 2003, Baltimore, Md., July 6-9.

Wherefore, what is claimed is:

1. A computer-implemented process for facilitating the identification of a current speaker in each frame of a low frame-rate video, comprising using a computer to perform the following process actions:

obtaining audio and video of an event having multiple people in attendance;

transmitting the video of the event at a prescribed frame rate to a client computing device;

tracking the movements of the attendees and recording their positions when each video frame is transmitted and their subsequent positions between the transmission of the video frames;

periodically identifying which of the attendees is currently speaking at a rate significantly faster than the prescribed video frame rate;

periodically generating an indicator which comprises the location of the attendee who is currently speaking as depicted in the last-transmitted video frame regardless of their current position;

embedding the indicators as they are generated into the obtained audio of the event using an audio watermarking technique; and continuously transmitting the audio of the event with the embedded indicators to the client computing device for use in highlighting a region in the last-transmitted video frame depicting the attendee at the location specified in the last-embedded indicator.

2. The process of claim 1, further comprising the process actions of:

each time an indicator is generated which comprises the location of the attendee who is currently speaking, generating a separate indicator for each attendee depicted in the last-transmitted video frame who is not currently speaking which comprises the location of the non-speaking attendee as depicted in the video frame regardless of the attendee's current position; and embedding each of said indicators associated with non-speaking attendees into the obtained audio of the event using said audio watermarking technique for use in un-highlighting a region in the last-transmitted video frame depicting the non-speaking attendee at the location specified in the indicator whenever that region is highlighted based on a previously embedded indicator specifying the attendee under consideration was then speaking.

3. The process of claim 2, wherein the process action of periodically generating an indicator which comprises the location of the attendee who is currently speaking, comprises the action of generating said indicator at a prescribed interval.

4. The process of claim 2, wherein the process action of periodically generating an indicator which comprises the location of the attendee who is currently speaking, comprises the actions of:

generating an indicator immediately after the generation of each video frame; and thereafter, generating indicators only when either an attendee who was not speaking at the time the last indicator was generated begins speaking or an attendee that was speaking at the time the last indicator was generated stops speaking.

5. The process of claim 1, wherein the video and audio are transmitted directly to the client computing device.

6. The process of claim 1, wherein the video and audio are transmitted to the client computing device via a computer network.

7. The process of claim 2, wherein each indicator takes the form of a tuple comprising a location parameter which specifies the location in the last-transmitted video frame where an attendee associated with the tuple is depicted.

8. The process of claim 7, wherein each tuple further comprises a speaker status parameter which specifies if the attendee associated with the tuple is currently speaking or not.

9. A system for facilitating the identification of a current speaker in each frame of a low frame-rate video, comprising:
   a general purpose computing device;
   at least one video camera;
   at least one microphone; and
   a computer program comprising program modules executable by the computing device, comprising,
      a video stream creation module which generates a data stream of video frames at a prescribed frame rate,
      a current speaker detection module which,
         periodically identifies the current speaker among the persons depicted in each video frame of the video stream at a rate substantially faster than the video frame rate, and
         tracks the movements of the persons depicted in each video frame between the generation of said frames so as to equate their current location with their original location when the video frame was generated;
      a current speaker data module which generates indicators, each of which specifies,
         the location of a person depicted in a video frame associated with the indicator, and
         whether the person whose location is specified is currently speaking or not,
      an audio data stream creation module which generates a continuous stream of audio data, and
      an audio watermark encoder module which embeds said indicators as they are generated into the audio data stream using an audio watermarking technique,
      a transmission module which transmits the video stream and indicator-embedded audio stream to a client computing device or transfers the streams to storage for later transmission to the client computing device.

10. The system of claim 9, wherein the computer program further comprises a video encoder module which encodes the video data stream prior to transmission or storage.

11. The system of claim 9, wherein the computer program further comprises an audio encoder module which encodes the audio data stream prior to transmission or storage.

12. The system of claim 9, wherein the computer program further comprises a sound source localization module which uses the audio data stream to identify the location of persons depicted in the video frames of the video data stream.

13. The system of claim 12, wherein the current speaker detection module comprises sub-modules for using the video data stream and person location information generated by the sound source localization module to periodically identify the current speaker among the persons depicted in each video frame of the video stream at a rate substantially faster than the video frame rate, and track the movements of the persons depicted in each video frame between the generation of said frames so as to equate their current location with their original location when the video frame was generated.

14. The system of claim 9, wherein the current speaker data module comprises a tuple generator sub-module which generates said indicators in the form of tuples, each of which comprises,
   a location parameter identifying the location of a person depicted in a video frame associated with the tuple as depicted in that frame, and
   a speaker status parameter identifying whether the person whose location is specified by the location parameter of the tuple is currently speaking or not.

15. A computer-implemented process for highlighting the current speaker in each frame of a low frame-rate video of an event having multiple people in attendance, comprising using a computer to perform the following process actions:
   obtaining the low frame-rate video of the event;
   obtaining a continuous audio stream of the event which has embedded therein via a watermarking technique periodically generated indicators, each of which comprises the location of the attendee who is currently speaking in a last-obtained video frame, wherein said indicators are generated at a rate significantly faster than the video frame rate;
   synchronizing the audio and video streams; and
   extracting each indicator from the audio stream as it is obtained and highlighting a region in last-obtained video frame based on the location of the current speaker specified in the indicator under consideration, wherein said highlighting visually distinguishes a current speaker from all other attendees depicted in the last-obtained video frame.

16. The process of claim 15, wherein the process action of highlighting a region in the last-obtained video frame based on the location of the current speaker specified in an indicator under consideration, for each indicator extracted from the audio stream in turn, comprises the actions of:
   identifying a region in the video frame, which the indicator under consideration is associated with, that has a prescribed size and shape and which has a prescribed geometric relationship to the specified location of the current speaker;
   modifying the appearance of all or a part of the region in a prescribed manner so as to visually distinguish a current speaker from all other attendees depicted in the video frame.

17. A system for highlighting the current speaker in each frame of a low frame-rate video of an event having multiple people in attendance, comprising:
   a general purpose computing device;
   a computer program comprising program modules executable by the computing device, comprising,
      a video input module which obtains the low frame-rate video of the event,
      an audio input module which obtains a continuous audio stream of the event that has embedded therein via a watermarking technique periodically generated indicators, each of which comprises the location of an attendee depicted in the last-obtained video frame and indicates if that attendee is currently speaking or not, wherein said indicators are generated at a rate significantly faster than the video frame rate,
      a synchronizer module which synchronizes the audio and video streams,
      an audio watermark detector module which extracts each indicator from the audio stream as it is obtained,
      a speaker highlighting module which highlights a region in the last-obtained video frame that is associated with an attendee that a last-extracted indicator specifies is currently speaking, based on the location of the attendee specified in that indicator, wherein said highlighting visually distinguishes a current speaker from all other attendees depicted in the last-obtained video frame that are not currently speaking.

18. The system of claim 17, wherein the highlighting module comprises sub-modules which for each indicator extracted:

determines from the indicator under consideration if the attendee associated with that indicator is currently speaking or not;

whenever it is determined the attendee associated with the indicator under consideration is speaking, determines if a region of the last-obtained video frame which is associated with the location of the current speaker specified in the indicator under consideration is highlighted or not; and whenever it is determined the region of the last-obtained video frame which is associated with the location of the current speaker specified in the indicator under consideration is not highlighted, highlights that region in a prescribed manner.

19. The system of claim 18, wherein the highlighting module further comprises sub-modules which for each indicator extracted that it is determined the attendee associated with the indicator is not speaking:

determines if a region of the last-obtained video frame which is associated with the location of the non-speaking attendee specified in the indicator under consideration is highlighted or not; and whenever it is determined the region of the last-obtained video frame which is associated with the location of the non-speaking attendee is highlighted, un-highlights that region.

20. The system of claim 17, wherein the low frame-rate video is encoded, and wherein the computer program further comprises a module for decoding the video prior to the highlighting module processing it.

21. The system of claim 17, wherein the audio is encoded, and wherein the computer program further comprises a module for decoding the audio prior to the audio watermark detector module processing it.

* * * * *